No. 891,221. PATENTED JUNE 16, 1908.
J. L. WOODBRIDGE.
TRAIN LIGHTING SYSTEM.
APPLICATION FILED JUNE 21, 1907.
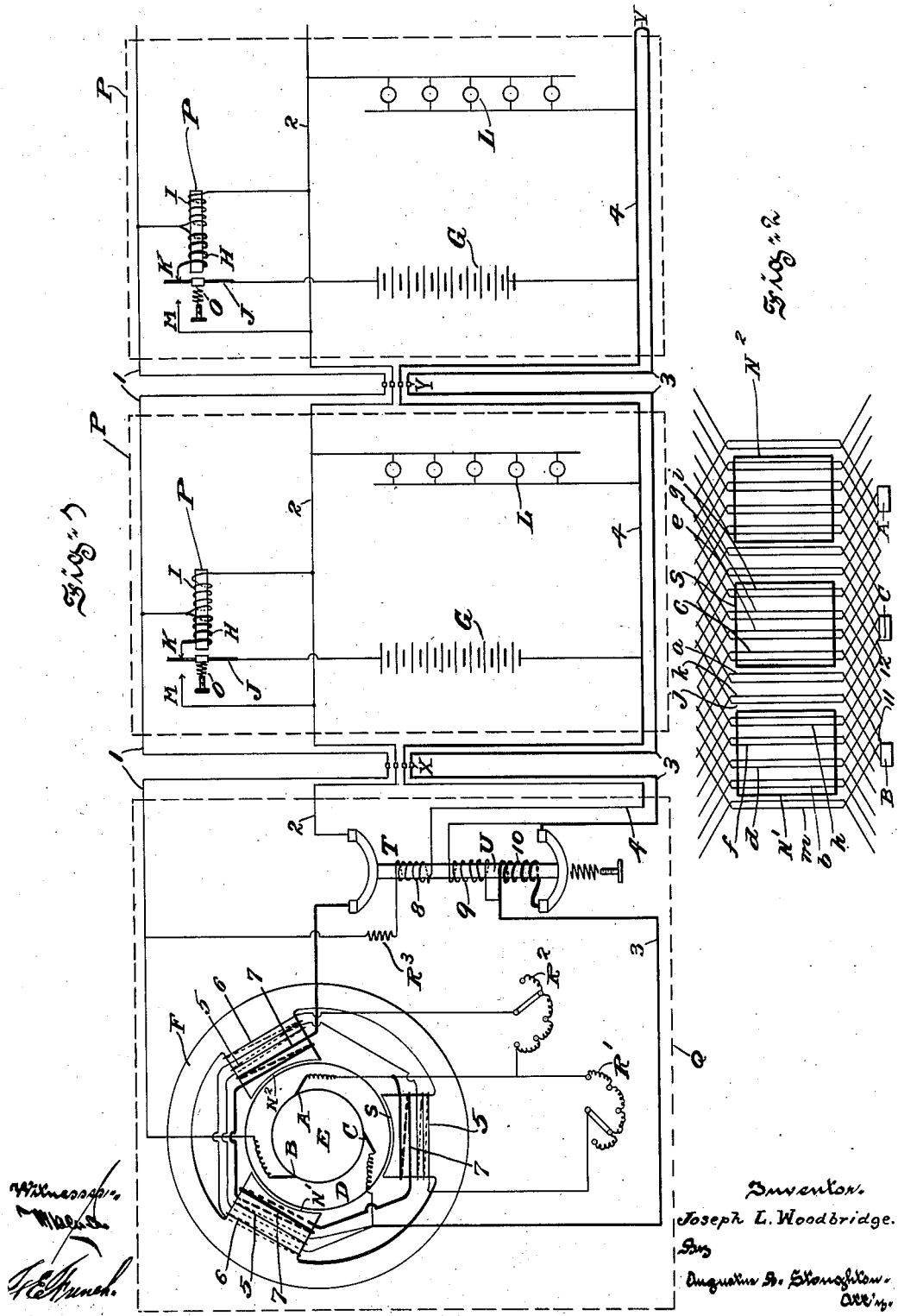
Inventor.
Joseph L. Woodbridge.

UNITED STATES PATENT OFFICE.

JOSEPH LESTER WOODBRIDGE, OF PHILADELPHIA, PENNSYLVANIA.

TRAIN-LIGHTING SYSTEM.

No. 891,221.　　　　Specification of Letters Patent.　　Patented June 16, 1908.

Application filed June 21, 1907. Serial No. 380,008.

*To all whom it may concern:*

Be it known that I, JOSEPH LESTER WOODBRIDGE, a citizen of the United States, and a resident of Philadelphia, in the county of Philadelphia and State of Pennsylvania, have invented a certain new and useful Train-Lighting System, of which the following is a specification.

One object of the invention is to provide means for obtaining two different voltages from the same generator, suitable respectively for operating the lamps and charging the batteries on the cars.

Other objects are to provide automatic means for controlling the two voltages, as well as means for automatically connecting the generator to the train line circuits and for transferring the batteries from the charging circuit to the lamp circuit.

The nature, characteristic features and scope of the invention will be more fully understood from the following description taken in connection with the accompanying drawings forming part hereof, and in which Figure 1, is a diagrammatic view of a car lighting system embodying features of the invention, and Fig. 2, illustrates the armature winding of the generator shown in Fig. 1.

In Fig. 1, a system of electric train lighting is shown diagrammatically. It is of the type commonly known as "Head end system". The apparatus inclosed in the rectangle Q, is installed at one point in the train where power is available for driving the generator, as in the baggage car or on the locomotive. The apparatus shown in the rectangles P, is installed on the individual cars and this apparatus is identical on each car, corresponding parts being represented by the same letters. Conductors 1, 2, 3, and 4, traverse the several cars and are connected between the cars by suitable couplings as at X and Y.

Referring to the apparatus in the rectangle Q, F, is the field frame and D, the armature of a direct current generator. The field circuit is provided with three poles S, $N^1$ and $N^2$, located at equi-distant points around the armature periphery. E, is the commutator of this generator and bearing upon the commutator are three brushes A, B and C. The armature winding, which will be described later in connection with Fig. 2, is so designed that the difference of potential between the brushes C and A, and that between the brushes C and B, may be controlled independently. As here shown the pole S is of south polarity, while the poles $N^1$ and $N^2$, are both of north polarity. The total magnetic flux in the field circuit passes through the pole S, but is divided between the poles $N^1$ and $N^2$. If this flux is equally divided between $N^1$ and $N^2$, the potential between the brushes A and C, will be the same as the potential between the brushes B and C. If, however, the division of flux between $N^1$ and $N^2$, is not equal, the two potentials above mentioned will be different. The total flux in the field circuit and the division of this flux between the poles $N^1$ and $N^2$ are controlled by three field windings. One of these windings 5, is wound on all three poles and is connected in shunt between the brush C and the brush A, a rheostat $R^1$, being connected into this circuit for controlling the current in this winding in the usual manner. This winding will control the total flux in the entire field circuit and with this winding alone the flux would be equally divided between $N^1$ and $N^2$.

A second field winding 6, is shown wound only on the poles $N^1$ and $N^2$ and connected in shunt between the brushes C and A with the rheostat $R^2$ in circuit. The effect of this winding is to increase the flux in $N^1$ and decrease that in $N^2$, thereby producing a higher potential between the brushes B and C and a lower potential between the brushes A and C, than would otherwise exist. The third winding 7, is connected in series between the brush A and the conductor 2. The turns of this winding on the poles $N^1$ and $N^2$ are so designed as to decrease the flux in $N^1$ and increase that in $N^2$ upon increase of current in this winding. The increasing saturation of $N^2$ and decreasing saturation of $N^1$ might effect a decrease in the total flux in $N^1$ and $N^2$ combined, under these conditions, but the turns of this winding on pole S are so designed as to tend to increase the total flux and counteract this effect. By reference to Fig. 2, herein later described, it will be seen that an increase in the flux in pole $N^2$, accompanied by a decrease in the flux in the pole $N^1$, (the flux in S remaining constant) will increase the potential between the brushes C and A and decrease the potential between the brushes C and B.

Referring to the train line conductors 1, is a high potential conductor used for charging the storage batteries on the various cars. Conductor 2, is a conductor supplied with lower potential suitable for the lamps on the various cars. Conductor 4, constitutes a common return for the current of both the lamps and the batteries. Conductor 3, extends through the entire train from the brush C of the generator and connects to conductor 4, at a point V, at the extreme end of the train, but is not connected to any apparatus in the cars at intermediate points. A double pole automatic switch T, is shown for automatically making and breaking connection between conductors 2, and 3, and the corresponding brushes A and C of the generator. This switch is operated by solenoids 8, 9, and 10, acting on a magnetic core U. When the conductors 4, and 3, are connected at the point V, the coils 8 and 9 will be connected in series across the circuits 1—3, with the resistance $R^3$ inserted in series with the coils. These coils are so designed that when the total potential across the circuit 1—3, reaches a certain desired point the windings 8 and 9, will exert a sufficient pull on the core U to close the switch and make connection between the generator and the circuits 2 and 3 on the cars. As soon as this switch is closed, current will flow through the coil 10, for supplying the lamps and charging the batteries on the cars and the effect of current in this coil will be to hold the switch more firmly in the closed position, at the same time the coil 9, will be short circuited, leaving the coil 8, operative to hold the switch in the closed position so long as the potential across the conductors 1—4, in conjunction with the current in coil 10, is sufficient.

Should the common return circuit comprising conductors 3 and 4, be interrupted at some point, as V, between the lamps and the generator, while the switch T, is open, there would be no current in coils 8, 9, or 10, and the switch T would not close. Should this interruption occur while the switch T, is closed, only the coil 8 would be energized and this alone would not be sufficient to hold the switch T, in the closed position, and it would immediately open.

On each car is shown a storage battery G and a lamp circuit L. The latter is connected directly across the conductors 2, and 4; one terminal of the battery is connected to conductor 4, while the other terminal is connected to the lever J, of an automatic switch. This switch is controlled by the coils H and I, wound on a magnetic core P. The coil I, is connected between the conductors 1 and 2, and when there is sufficient difference of voltage between these two conductors the current in the coil I will be sufficient to overcome the force of the spring O and draw the lever J into contact with the contact point K, permitting current to flow from conductor 1, through the coil H, and the lever J, into the battery in charging direction. The current thus flowing through the coil H will serve to hold the lever J, more firmly in contact with the contact point K. Should the potential between 1 and 2, fall, thus reducing the current in the coil I and also the charging current in the coil H, sufficiently, the spring O, will overcome the pull of the core P and the lever J, will be drawn into contact with the contact point M, thereby connecting the battery directly across the circuit 2—4, to which the lamp circuit L, is connected.

The general method of operation of the system above described is as follows: When the cars are disconnected from the generator there will be no difference of potential between the conductors 1 and 2, and no source of charging current for the batteries and thereby the lever J will be held in contact with the contact point M and the batteries will be supplying the current required by the lamps. If connections are made at the coupler X, between the generating apparatus and the balance of the train, with the switch T open, no change will occur at the automatic car switches, since there will still be no difference of potential between the conductors 1 and 2, and therefore no current in the coils I. When, however, the potential developed at the generator, between brushes C and B is sufficient to close the switch T by reason of the current in the coils 8 and 9, a difference of potential will immediately be established between the conductors 1 and 2, for the reason that the excitation produced by the field coils 6, on the generator will cause a difference of magnetic flux in the poles $N^1$ and $N^2$ and therefore a difference of potential between the brushes A and B. This difference of potential will send current through the coils I, drawing the lever J, into contact with the contact point K. The batteries will then be connected between the conductor 4 and the high potential conductor 1 and will receive charging current. The current required by the lamps in the lamp circuit L will be furnished from the conductors 2—4, fed by the brushes A and C. The current in the lamp circuit under these conditions will flow from the brush A through the series winding 7 on the generator and the effect of this series winding will be to increase the potential across the brushes C and A and to decrease the potential across the brushes B and C and this effect will be proportional to the current required by the lamps. The increase of potential across the brushes C and A may be made to compensate for the line drop in the conductors 2, 3, and 4, thus maintaining approximately constant potential at the lamps with change of load. The decrease in the potential across the brushes B and C will reduce the charging current fed to the batteries, thus tending to compensate for the increase in current required by the lamps and prevent an overload on the generator, which might otherwise result from such increase in current.

Fig. 2, illustrates diagrammatically in the usual manner the method of winding the armature of the generator, shown in Fig. 1. Rectangular areas S, $N^1$ and $N^2$, represent the pole faces of the generator, while A, B, and C, represent the three brushes. Starting from the point 11, in the armature winding under brush B and following the winding through the conductors $a, b, c, d, e, f, g, h, i, j$, to the point 12 under the brush B, it will be noted that this portion of the armature winding is affected by the flux in poles $N^1$ and S only, and that the electro-motive-force developed in each of the conductors under the pole faces will be cumulative and produce a total electro-motive-force between the brushes B and C, proportional to the sum of the magnetic flux in S and that in $N^1$. Similarly it will be seen that the potential between the brushes C and A will be proportional to the total flux in S and $N^2$. On the other hand the potential between the brushes A and B, will be proportional to the difference between the flux in $N^1$ and that in $N^2$. It will be noted also that the conductors $k$ and $m$, which constitute the armature coil short circuited by the brush B, are passing through the neutral area between the pole faces and are therefore developing no electro-motive-force. The same is true of the coils short circuited by the brushes C and A. This arrangement will therefore permit satisfactory commutation to be secured.

I do not claim herein the generator by itself, as it is made the subject-matter of my application Serial No. 380,009, filed June 21st, 1907, but What I do claim as my invention and desire to secure by Letters Patent is 1. In combination a direct current generator adapted to develop two different voltages from a single armature winding and commutator; three brushes bearing on the commutator, whereof two are arranged to collect current at two different potentials with respect to the third; three conductors constituting a high potential and a low potential circuit with a common return, automatic means for making connection between circuits and brushes when the potential of the generator exceeds a certain limit; translating devices connected between the low potential conductor and the common return; a storage battery connected at one terminal to the common return; and means adapted to connect the other battery terminal to the high potential conductor when the difference of potential between the high and low potential conductors exceeds a certain limit, and at other times to the low potential conductor.

2. In a train lighting system a generator field frame provided with polar projections in groups of three; field windings adapted to produce in each group magnetic flux of like polarity in two of the poles of said group and in the third a flux equal to the sum of that in the other two and of opposite polarity; means for controlling the division of flux between the two poles of like polarity; an armature in operative relation to the field poles and provided with a winding, commutator and brushes so disposed that the armature coils between any pair of brushes are acted upon by the flux in only two poles in each group of three; in combination with appropriate circuits, translating devices and storage batteries and switches adapted to make connection between translating devices, batteries and brushes whereby the translating devices may be operated from one potential when the batteries are charged from the other.

3. A source of direct current provided with three terminals and adapted to develop two voltages of like polarity but differing in amount between one of said terminals and the other two respectively, three conductors constituting a high potential and a low potential circuit with a common return and adapted for connection to the corresponding terminals of the source; automatic means for making connection between terminals and circuits when the potential of the source exceeds a certain limit; translating devices connected between the low potential conductor and the common return; a storage battery connected at one terminal with the common return; and automatic means for connecting the other battery terminal to the high potential conductor when the difference of potential between the high and low potential conductors exceeds a certain limit, and at other times to the low potential conductor.

4. In combination a source of electric current provided with suitable terminals, a consumption circuit including appropriate conductors and translating devices, a switch for connecting the source to the circuit, an electro-magnetic device for operating said switch, and two coils for operating said device, connected in series across the terminals of the source by means of a portion of one of the conductors of the consumption circuit, whereby a break in said portion will prevent the closing of the switch.

5. A source of electric current provided with suitable terminals, a consumption circuit including appropriate conductors and translating devices, means for connecting the circuit to the source including a switch for connecting one of said conductors to the corresponding terminal of the source, an electro-magnetic device for closing said switch, two coils for operating said device, whereof one is connected between said terminal of the source and a point on said conductor in proximity to said switch, and the other is connected between a terminal of said source of opposite polarity and a point on said conductor beyond, with respect to the switch, the point of connection to the translating devices.

In testimony whereof I have hereunto signed my name in the presence of two witnesses.

JOSEPH LESTER WOODBRIDGE.

Witnesses:
F. E. FRENCH,
W. J. JACKSON.